US012695230B2

(12) United States Patent
Wi et al.

(10) Patent No.: US 12,695,230 B2
(45) Date of Patent: Jul. 28, 2026

(54) TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Nungna Wi, Mie (JP); Teruo Hara, Mie (JP); Hiroki Kobayashi, Mie (JP); Takae Imayoshi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 316 days.

(21) Appl. No.: 18/567,003

(22) PCT Filed: May 13, 2022

(86) PCT No.: PCT/JP2022/020198
§ 371 (c)(1),
(2) Date: Dec. 4, 2023

(87) PCT Pub. No.: WO2022/270174
PCT Pub. Date: Dec. 29, 2022

(65) Prior Publication Data

US 2024/0266771 A1 Aug. 8, 2024

(30) Foreign Application Priority Data

Jun. 22, 2021 (JP) ................................ 2021-103267

(51) Int. Cl.
*H01R 13/11* (2006.01)

(52) U.S. Cl.
CPC ................................ *H01R 13/113* (2013.01)

(58) Field of Classification Search
CPC ............................ H01R 13/113; H01R 13/11
See application file for complete search history.

(56) References Cited

U.S. PATENT DOCUMENTS

| | | | | |
|---|---|---|---|---|
| 5,338,229 | A | 8/1994 | Egenolf | |
| 10,340,619 | B2 * | 7/2019 | Tsukiyoshi ........... | H01R 13/113 |

(Continued)

FOREIGN PATENT DOCUMENTS

| | | | |
|---|---|---|---|
| JP | H01-204376 A | 8/1989 | |
| JP | 2009-054504 A | 3/2009 | |
| WO | 1999/041807 A1 | 8/1999 | |

OTHER PUBLICATIONS

International Search Report issued on Aug. 9, 2022 for WO 2022/270174 A1 (2 pages).

*Primary Examiner* — Joseph Ortega
(74) *Attorney, Agent, or Firm* — Venjuris, P.C.

(57) ABSTRACT

A rectangular tube portion includes a first wall provided with the resilient contact piece, a second wall provided with the receiving portion and a pair of side walls connecting both side edges of the first wall and both side edges of the second wall. A facing direction of the pair of side walls is a first direction. At least one of the pair of side walls includes a resilient piece for suppressing a movement of the tab in the first direction by pressing a side edge of the tab inwardly of the rectangular tube portion 11 in the first direction. The rectangular tube portion includes a stopper portion for suppressing a movement of a tip part of the resilient piece inwardly of the rectangular tube portion in the first direction. The resilient piece includes a contact portion disposed to face the stopper portion in the first direction.

6 Claims, 16 Drawing Sheets

(56) References Cited

U.S. PATENT DOCUMENTS

| | | | |
|---|---|---|---|
| 2002/0065006 | A1 | 5/2002 | Heimueller |
| 2018/0294587 | A1 | 10/2018 | Tsukiyoshi et al. |
| 2021/0075137 | A1 | 3/2021 | Hung |
| 2021/0351533 | A1 | 11/2021 | Nishitani et al. |

* cited by examiner

TERMINAL

CROSS REFERENCE TO RELATED APPLICATIONS

This application is a national phase of PCT application No. PCT/JP2022/020198, filed on 13 May 2022, which claims priority from Japanese patent application No. 2021-103267, filed on 22 Jun. 2021, all of which are incorporated herein by reference.

TECHNICAL FIELD

The present disclosure relates to a terminal.

BACKGROUND

A terminal fitting used in an automotive vehicle or the like is conventionally known from Japanese Patent Laid-Open Publication No. 2009-054504 (Patent Document 1 below). This terminal fitting is provided with a rectangular tube portion, into which a tab of a mating terminal is inserted from front. A bottom wall of the rectangular tube portion is provided with a resilient contact piece, and an upper surface wall of the rectangular tube portion is provided with a receiving portion projecting downward. Resilient pieces cantilevered obliquely rearward are formed in a pair of left and right side walls of the rectangular tube portion. The tab inserted into the rectangular tube portion is sandwiched in a thickness direction between the resilient contact piece and the receiving portion and sandwiched in a width direction between the pair of resilient pieces. Since a movement of the tab in the width direction is suppressed by resilient pressing forces of the pair of resilient pieces, the wear of the tab, the resilient piece and the receiving portion can be suppressed. Therefore, the connection reliability of the terminal fitting and the mating terminal can be ensured even under a vibration environment of the automotive vehicle or the like.

Prior Art Document

Patent Document

Patent Document 1: JP 2009-054504 A

SUMMARY OF THE INVENTION

Problems to be Solved

However, in the above configuration, the resilient contact piece may be deformed or the insertion of the mating terminal into the rectangular tube portion may be hindered by the resilient pieces being bent inwardly of the rectangular tube portion by an external force.

Means to Solve the Problem

The present disclosure is directed to a terminal with a rectangular tube portion, a tab of a mating terminal being inserted into the rectangular tube portion from front, a resilient contact piece provided in the rectangular tube portion, and a receiving portion provided in the rectangular tube portion, the receiving portion sandwiching the tab together with the resilient contact piece, the rectangular tube portion including a first wall provided with the resilient contact piece, a second wall provided with the receiving portion and a pair of side walls connecting both side edges of the first wall and both side edges of the second wall, a facing direction of the pair of side walls being a first direction, at least one of the pair of side walls including a resilient piece for suppressing a movement of the tab in the first direction by pressing a side edge of the tab inwardly of the rectangular tube portion in the first direction, the rectangular tube portion including a stopper portion for suppressing a movement of a tip part of the resilient piece inwardly of the rectangular tube portion in the first direction, the resilient piece including a contact portion disposed to face the stopper portion in the first direction, the stopper portion being disposed between the resilient contact piece and the resilient piece in the first direction, and the tip part of the resilient piece being suppressed from contacting the resilient contact piece by the contact of the contact portion and the stopper portion.

Effect of the Invention

According to the present disclosure, it is possible to provide a terminal hardly deformed by an external force and capable of ensuring connection reliability with a mating terminal under a vibration environment.

DETAILED DESCRIPTION TO EXECUTE THE INVENTION

Description of Embodiments of Present Disclosure

Figure 1:
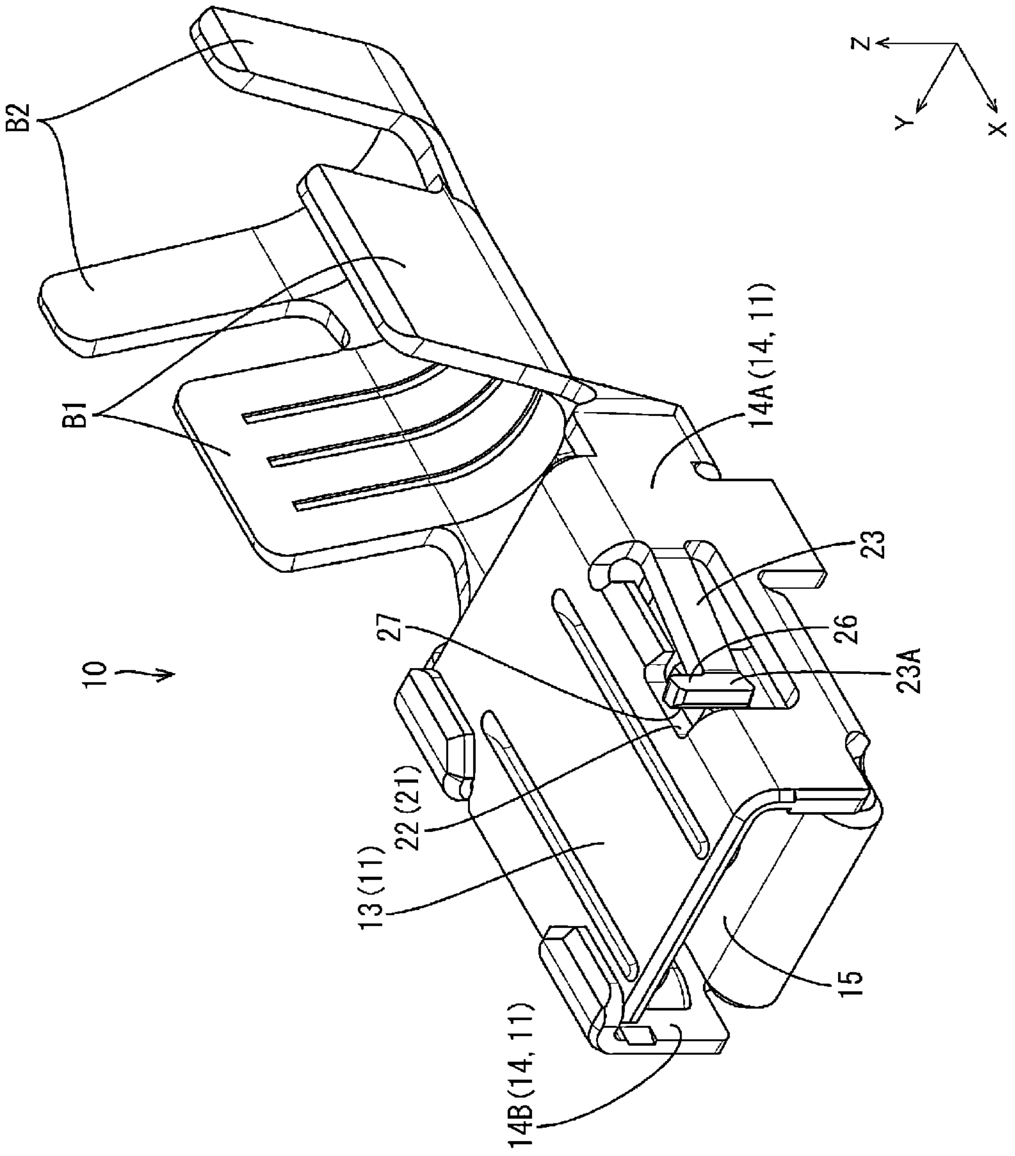
FIG. 1 is a perspective view of a terminal according to a first embodiment.

First, embodiments of the present disclosure are listed and described.

(1) The terminal of the present disclosure is provided with a rectangular tube portion, a tab of a mating terminal being inserted into the rectangular tube portion from front, a resilient contact piece provided in the rectangular tube portion, and a receiving portion provided in the rectangular tube portion, the receiving portion sandwiching the tab together with the resilient contact piece, the rectangular tube portion including a first wall provided with the resilient contact piece, a second wall provided with the receiving portion and a pair of side walls connecting both side edges of the first wall and both side edges of the second wall, a facing direction of the pair of side walls being a first direction, at least one of the pair of side walls including a resilient piece for suppressing a movement of the tab in the first direction by pressing a side edge of the tab inwardly of the rectangular tube portion in the first direction, the rectangular tube portion including a stopper portion for suppressing a movement of a tip part of the resilient piece inwardly of the rectangular tube portion in the first direction, the resilient piece including a contact portion disposed to face the stopper portion in the first direction, the stopper portion being disposed between the resilient contact piece and the resilient piece in the first direction, and the tip part of the resilient piece being suppressed from contacting the resilient contact piece by the contact of the contact portion and the stopper portion.

According to this configuration, since a movement of the tab in the first direction is suppressed by the resilient piece, the wear of the tab, the resilient contact piece and the receiving portion can be suppressed even under a vibration environment and the connection reliability of the terminal and the mating terminal can be ensured. A movement of the tip part of the resilient piece inwardly of the rectangular tube portion in the first direction can be suppressed by the contact of the contact portion of the resilient piece and the stopper portion of the rectangular tube portion. Since the stopper portion is disposed between the resilient contact piece and the resilient piece in the first direction, the tip part of the resilient piece can be suppressed from contacting the resilient contact piece. Therefore, the deformation of the resilient contact piece, a connection failure of the terminal and the mating terminal and the like can be suppressed.

(2) Preferably, either one of the first and second walls includes the stopper portion.

According to this configuration, since at least one of the pair of side walls includes the resilient piece and either one of the first and second walls includes the stopper portion, the contact portion of the resilient piece and the stopper portion are easily arranged to face each other.

(3) Preferably, the second wall includes the stopper portion.

According to this configuration, since the side wall not including the resilient contact piece is provided with the stopper portion, the contact of the resilient piece and the resilient contact piece is easily suppressed.

(4) Preferably, the resilient piece includes a body portion long in a front-rear direction and an extending portion extending from a tip part of the body portion in a direction orthogonal to both the first direction and the front-rear direction, and the extending portion includes the contact portion.

According to this configuration, a contact part of the contact portion and the stopper portion is easily made larger. Thus, the contact of the resilient piece with the resilient contact piece can be further suppressed.

(5) Preferably, the rectangular tube portion includes a recess recessed in the first direction, the recess includes the stopper portion, and the extending portion is disposed inside the recess.

According to this configuration, since the extending portion is disposed inside the recess, the tip part of the resilient piece can be arranged further inwardly of the rectangular tube portion in the first direction than the side wall provided with the resilient piece.

(6) Preferably, only one of the pair of side walls includes the resilient piece, and the other of the pair of side walls includes a pushing portion for sandwiching the tab in the first direction together with the resilient piece.

According to this configuration, since a movement of the tab in the first direction is suppressed by the resilient piece and the pushing portion, the connection reliability of the terminal and the mating terminal can be ensured even under a vibration environment. Since the resilient piece is provided in only one of the pair of side walls, the tip part of the resilient piece is less likely to move inwardly of the rectangular tube portion as compared to the case where resilient pieces are provided in both of the pair of side walls.

(7) The terminal of the present disclosure is provided with a rectangular tube portion, a tab of a mating terminal being inserted into the rectangular tube portion from front, a resilient contact piece provided in the rectangular tube portion, and a receiving portion provided in the rectangular tube portion, the receiving portion sandwiching the tab together with the resilient contact piece, the rectangular tube portion including a first wall provided with the resilient contact piece, a second wall provided with the receiving portion and a pair of side walls connecting both side edges of the first wall and both side edges of the second wall, a facing direction of the pair of side walls being a first direction, and one of the pair of side walls including a resilient piece for suppressing a movement of the tab in the first direction by pressing a side edge of the tab inwardly of the rectangular tube portion in the first direction and a projecting portion disposed in front of the resilient piece and projecting inwardly of the rectangular tube portion.

According to this configuration, since a movement of the tab in the first direction is suppressed by the resilient piece, the wear of the tab, the resilient contact piece and the receiving portion can be suppressed even under a vibration environment and the connection reliability of the terminal and the mating terminal can be ensured. Since the projecting portion is provided in front of the resilient piece, the tab comes into contact with the projecting portion earlier than the resilient piece when being inserted into the rectangular tube portion. Therefore, the deformation of the resilient piece due to contact with the tab can be suppressed.

(8) Preferably, the resilient piece extends in a front-rear direction, a rear end part of the resilient piece is connected to one of the pair of side walls, and a pressing portion for pressing the tab is disposed at a position near a front end part of the resilient piece.

According to this configuration, since the pressing portion of the resilient piece is disposed near the projecting portion, the deformation of the resilient piece is more easily suppressed.

(9) Preferably, the tab inserted into the rectangular tube portion is sandwiched between the projecting portion and the other of the pair of side walls.

According to this configuration, since the tab is sandwiched between the projecting portion and the other of the pair of side walls, the wear of the tab, the resilient contact piece and the like can be further suppressed under a vibration environment.

Details of Embodiments of Present Disclosure

Hereinafter, embodiments of the present disclosure are described. The present disclosure is not limited to these illustrations, but is represented by claims and intended to include all changes in the scope of claims and in the meaning and scope of equivalents.

First Embodiment

A first embodiment of the present disclosure is described with reference to FIGS. 1 to 10. A terminal 10 of this embodiment is, for example, mounted in a vehicle such as an automotive vehicle and used under a vibration environment where vibration is generated. In the following description, a direction indicated by an arrow Z is referred to as an upward direction, a direction indicated by an arrow X is referred to as a forward direction and a direction indicated by an arrow Y is referred to as a rightward direction.

[Terminal]

Figure 6:
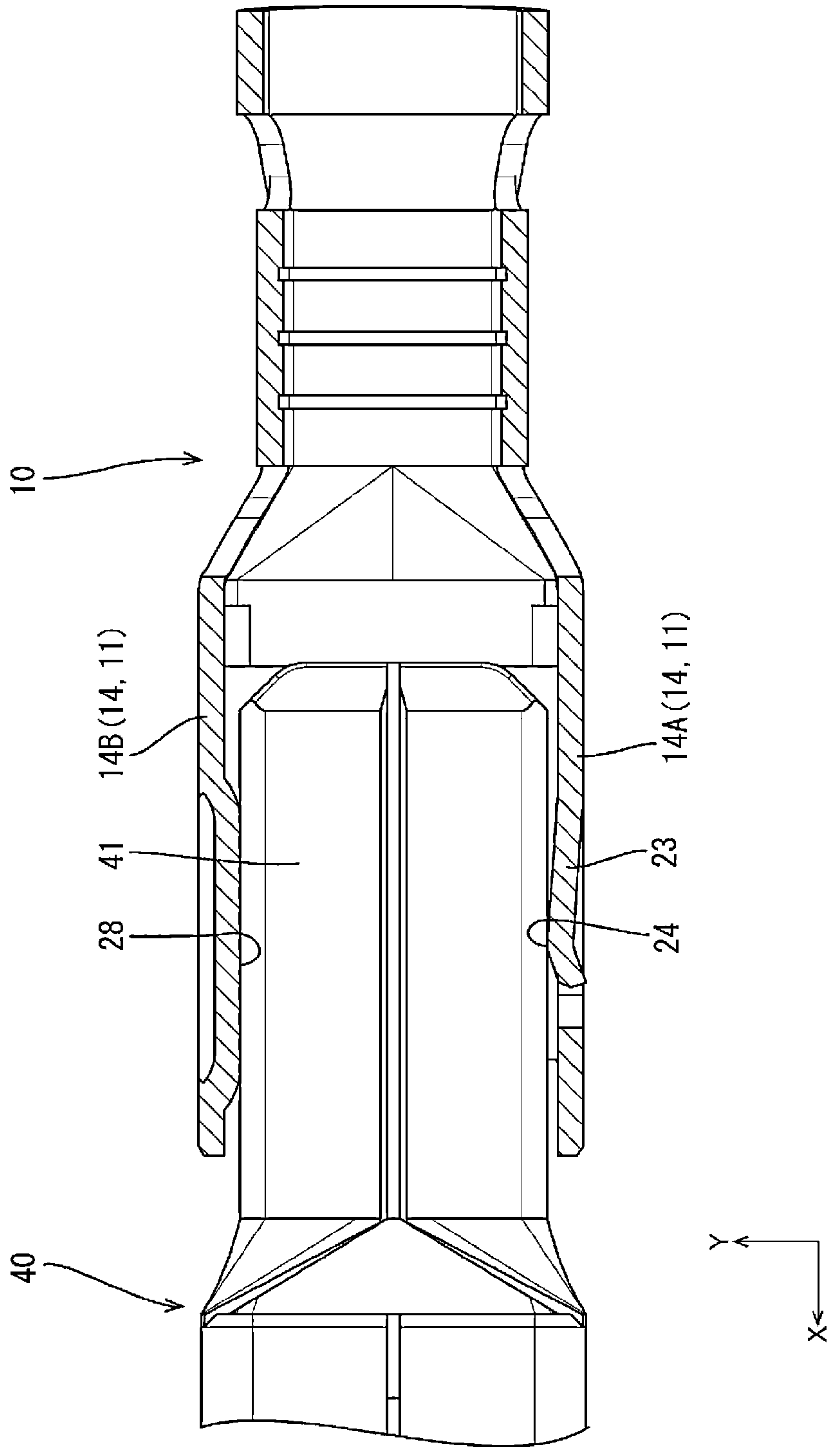
FIG. 6 is a section along A-A of FIG. 3 showing a state where a tab of a mating terminal is inserted in a rectangular tube portion.

The terminal 10 is formed by press-working and bending an electrically conductive metal plate material. As shown in FIG. 1, the terminal 10 is provided with a rectangular tube portion 11 open in a front-rear direction in a substantially front half of the terminal 10 and a wire barrel B1 and an insulation barrel B2 disposed behind the rectangular tube portion 11. As shown in FIG. 6, a tab 41 of a mating terminal 40 is inserted into the rectangular tube portion 11 from front. The wire barrel B1 is crimped to a core wire of an unillustrated coated wire, and the insulation barrel B2 is crimped to an insulation coating the unillustrated coated wire.

[Rectangular Tube Portion, First Wall, Second Wall, Pair of Side Walls]

Figure 3:
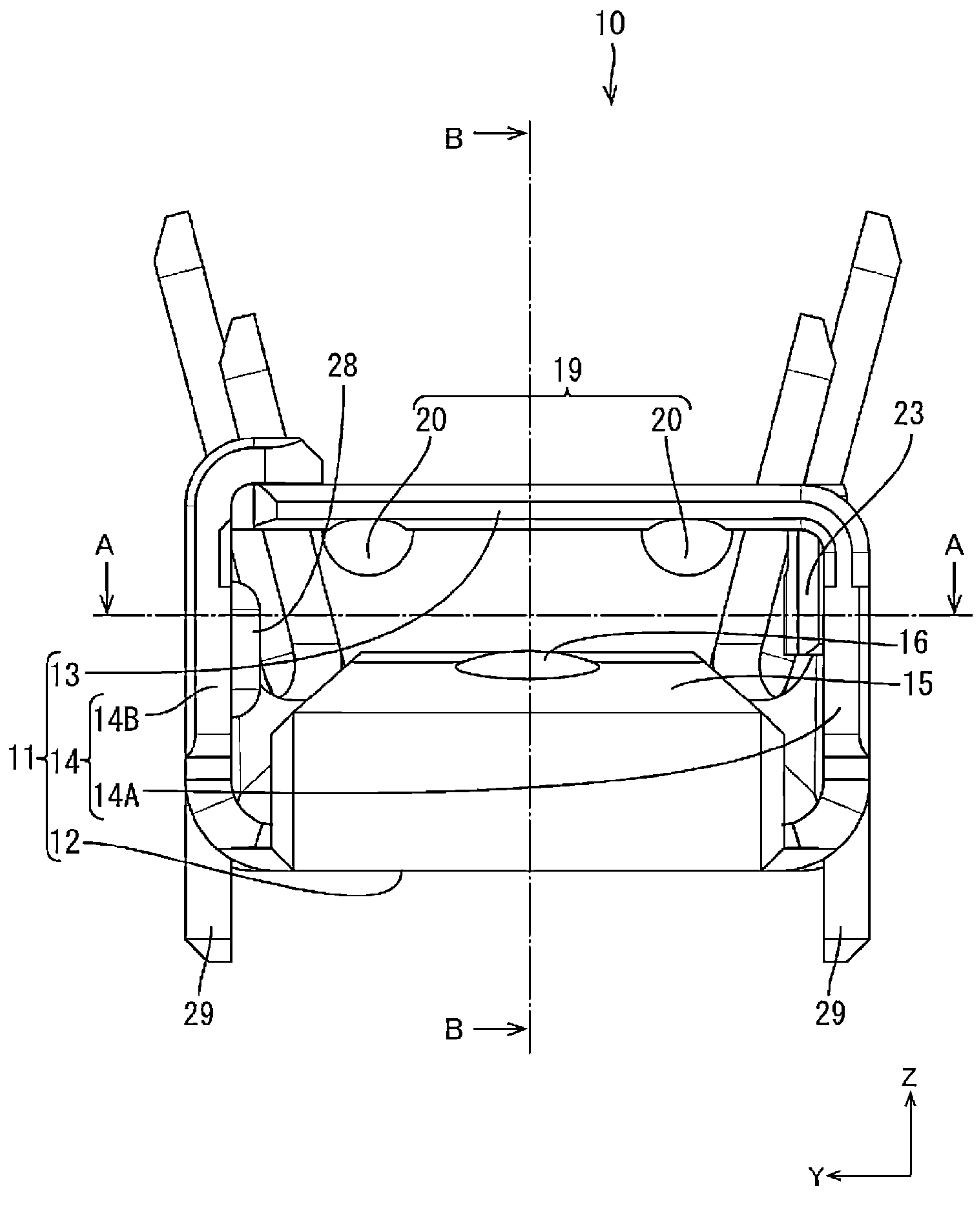
FIG. 3 is a front view of the terminal.
Figure 8:
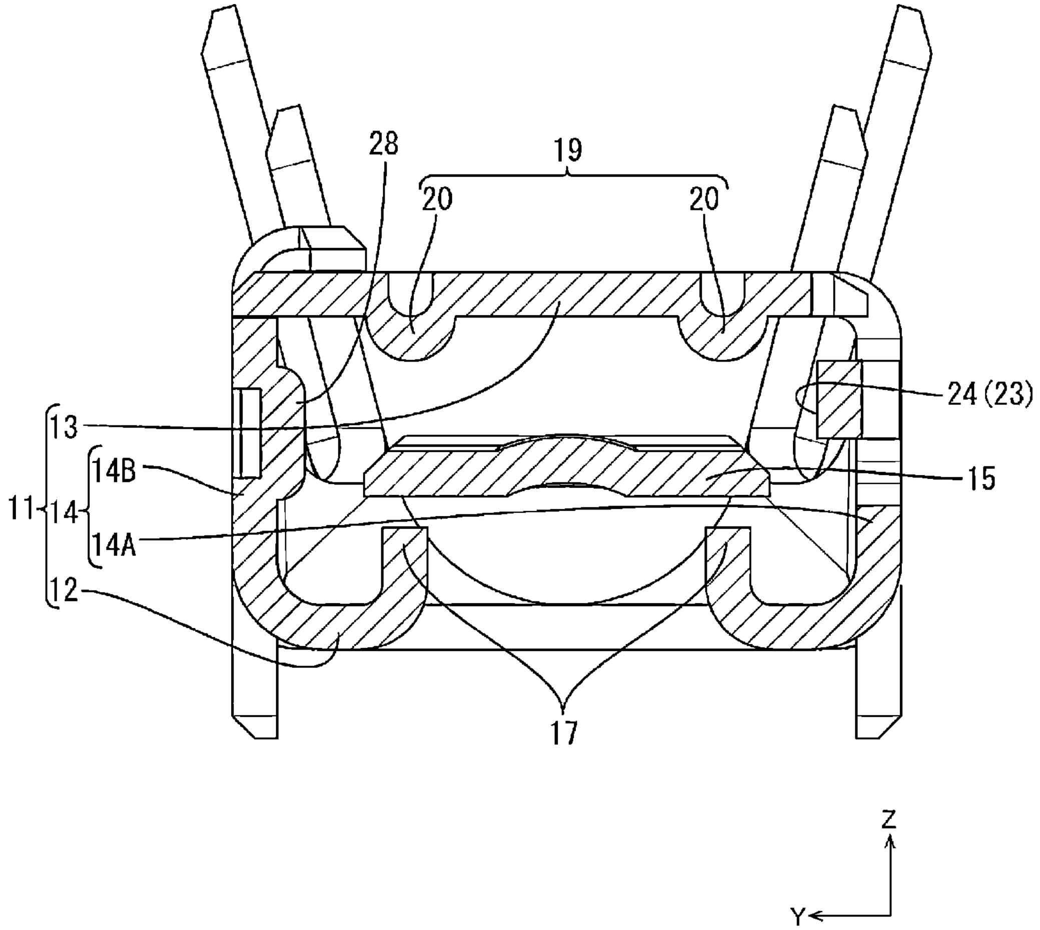
FIG. 8 is a section along C-C of FIG. 4.

As shown in FIGS. 3 and 8, the rectangular tube portion 11 includes a first wall 12 disposed on a lower side of the rectangular tube portion 11, a second wall 13 facing the first wall 12 and a pair of side walls 14 connecting both side edges of the first wall 12 and those of the second wall 13. A facing direction of the pair of side walls 14 is a lateral direction (an example of a first direction). One of the pair of side walls 14 serves as a third wall 14A disposed on a left side of the rectangular tube portion 11. The other side wall 14 serves as a fourth wall 14B disposed on a right side of the rectangular tube portion 11.

[Resilient Contact Piece, Contact Point Portion]

Figure 7:
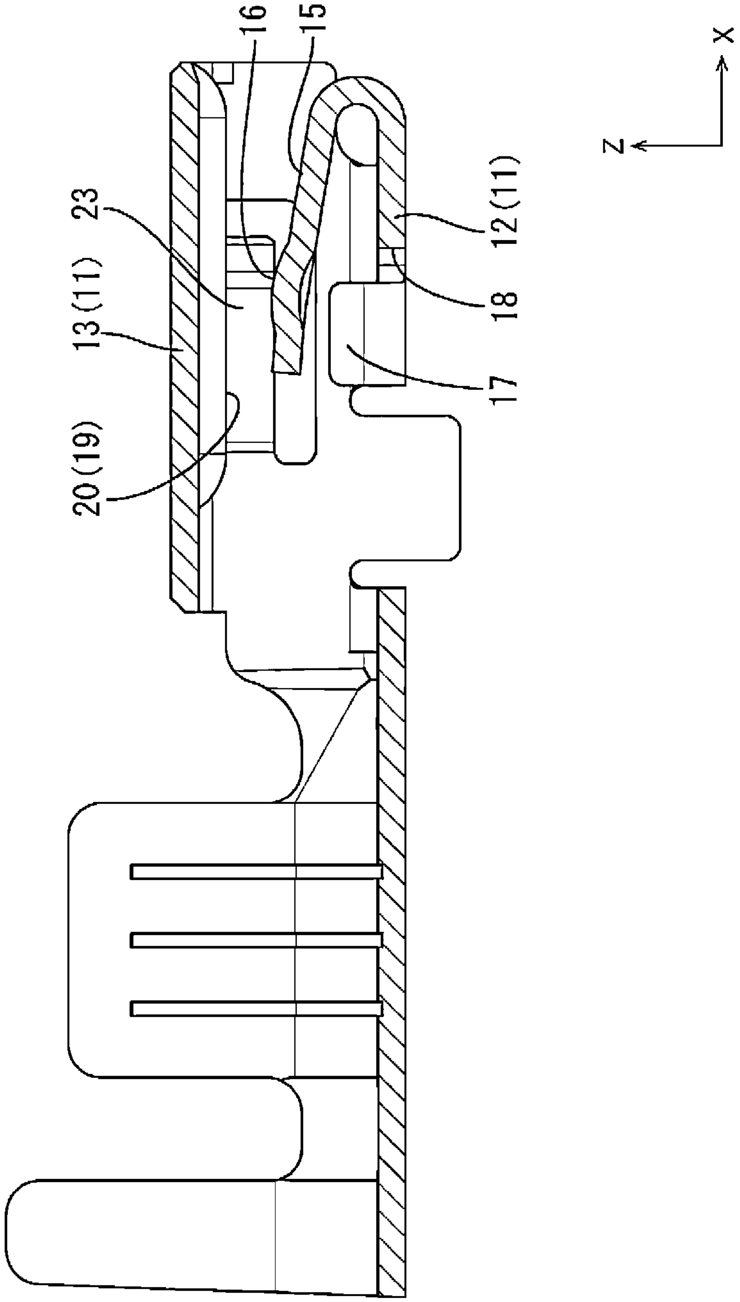
FIG. 7 is a section along B-B of FIG. 3.
Figure 9:
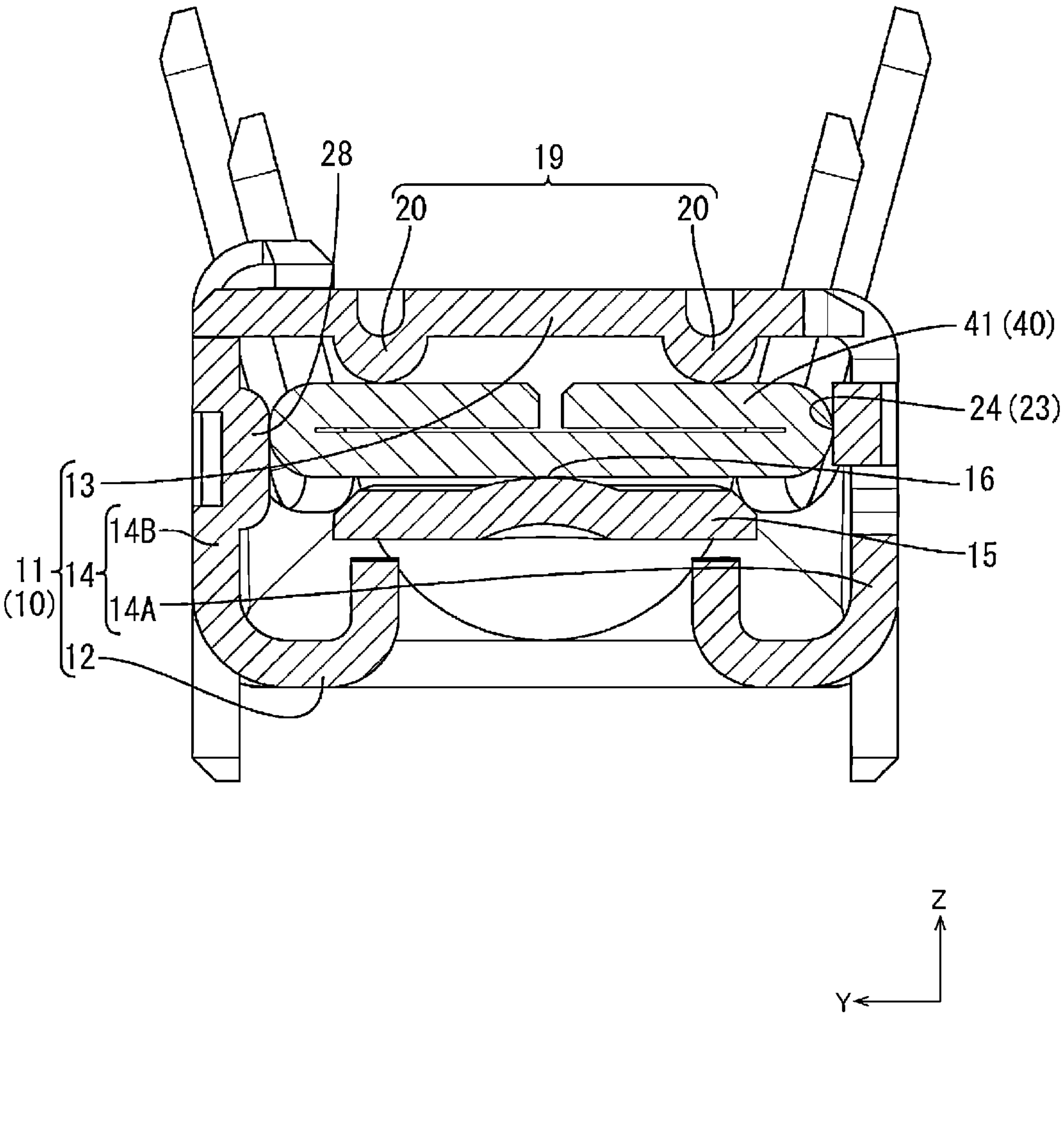
FIG. 9 is a section along C-C of FIG. 4 showing the state where the tab of the mating terminal is inserted in the rectangular tube portion.

As shown in FIG. 7, a resilient contact piece 15 folded rearward is provided on the front end of the first wall 12. The resilient contact piece 15 is cantilevered obliquely rearward to an upper side in the rectangular tube portion 11 and deflected and deformed downward. A contact point portion 16 projecting upward is provided on the upper surface of the resilient contact piece 15. The contact point portion 16 is formed by striking and has a spherical shape as a whole. As shown in FIG. 9, with the tab 41 of the mating terminal 40 inserted in the rectangular tube portion 11, the lower surface (surface facing the first wall 12) of the mating terminal 41 is in contact with an apex of the contact point portion 16.

As shown in FIG. 8, excessive deflection preventing portions 17 for suppressing downward deformation of the resilient contact piece 15 are provided below the resilient contact piece 15 of the first wall 12. A pair of the excessive deflection preventing portions 17 are formed below right and left end parts of the resilient contact piece 15 by cutting and raising. As shown in FIG. 7, the first wall 12 includes a locking portion 18 for locking the terminal 10 to an unillustrated housing.

[Receiving Portion]

As shown in FIGS. 3 and 8, the second wall 13 is provided with a receiving portion 19 projecting downward from the lower surface of the second wall 13. The receiving portion 19 is formed by being struck downward. The receiving portion 19 is composed of a pair of ridge portions 20 arranged in the lateral direction. As shown in FIG. 7, the ridge portion 20 is formed to extend in the front-rear direction. An interval in the vertical direction between the lower end of the ridge portion 20 and the apex of the contact point portion 16 is set to be smaller than a vertical dimension of the tab 41. As shown in FIG. 9, with the tab 41 inserted in the rectangular tube portion 11, the tab 41 is sandwiched in the vertical direction between the contact point portion 16 of the resilient contact piece 15 and the receiving portion 19. In this way, the terminal 10 and the mating terminal 40 are electrically connected.

[Recess, Stopper Portion]

Figure 2:
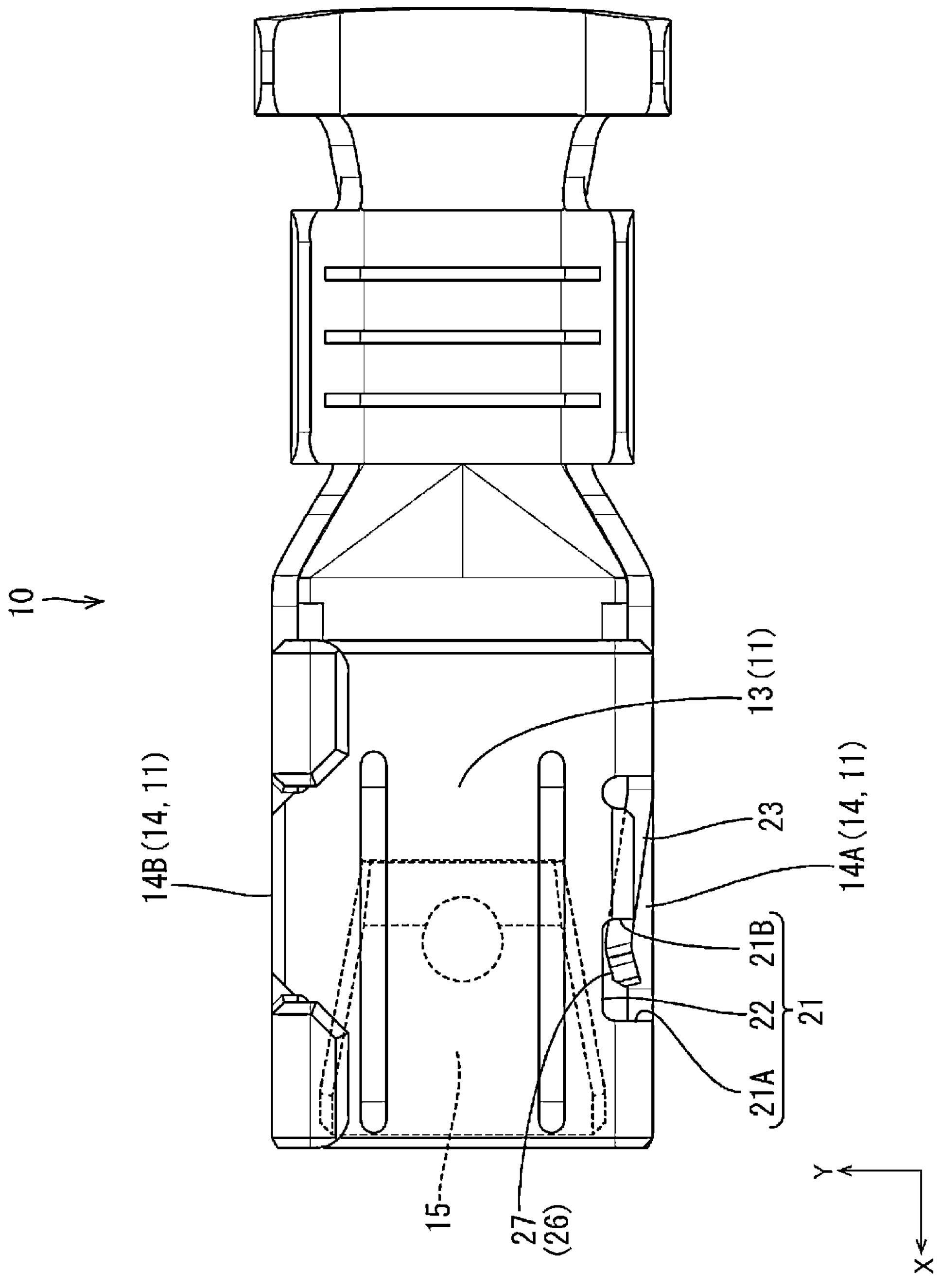
FIG. 2 is a plan view of the terminal.

As shown in FIG. 2, the second wall 13 includes a recess 21 recessed rightward in a left end part. The recess 21 is disposed forward of a center position in the front-rear direction of the second wall 13. The recess 21 has a front surface 21A disposed on a front side, a rear surface 21B disposed on a rear side and a stopper portion 22 connecting a right end part of the front surface 21A and a right end part of the rear surface 21B. The stopper portion 22 is a surface substantially parallel to the third wall 14A. The stopper portion 22 is disposed between the resilient contact piece 15 and a resilient piece 23 to be described later in the lateral direction (see FIG. 10).

[Resilient Piece]

Figure 5:
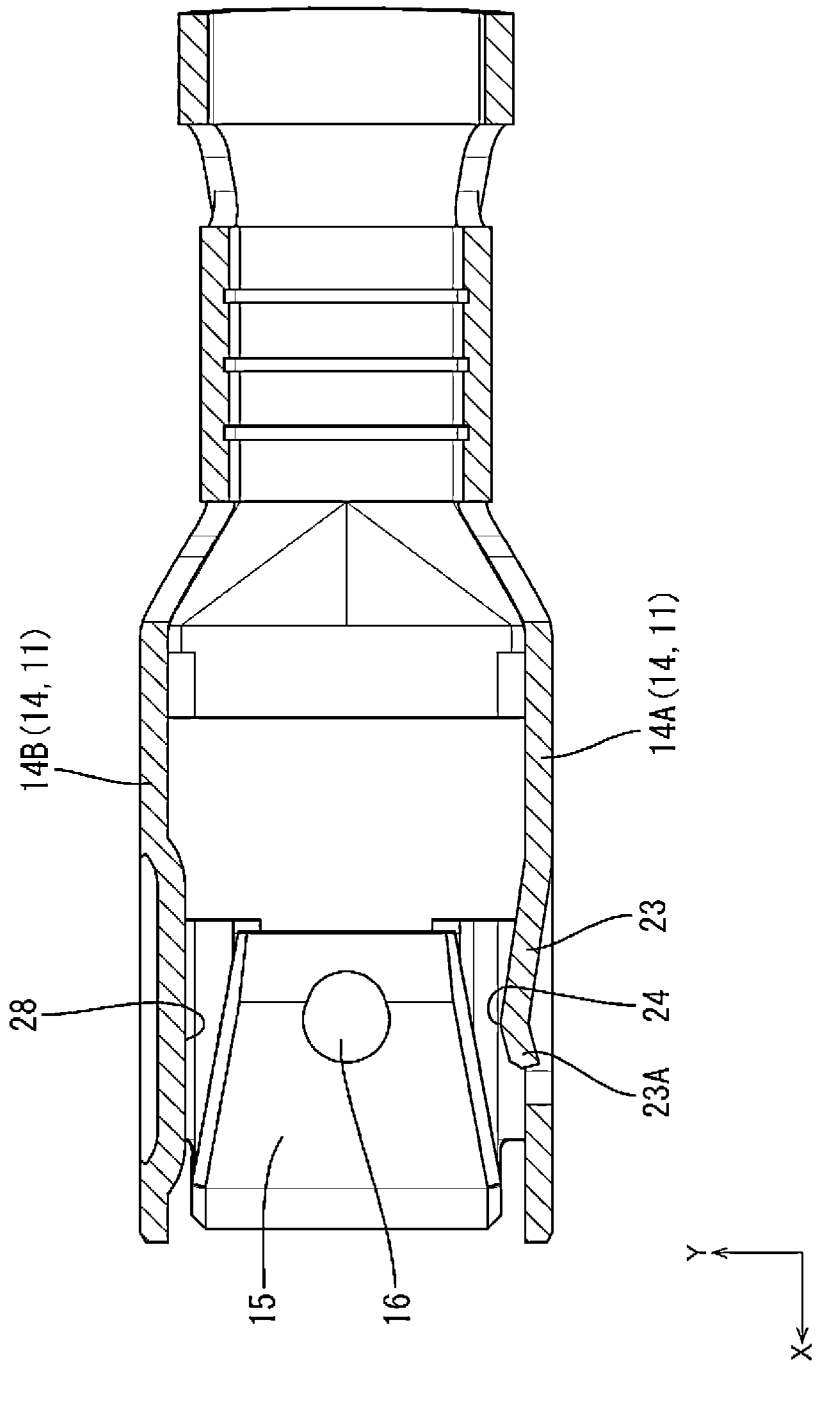
FIG. 5 is a section along A-A of FIG. 3.

As shown in FIG. 1, the third wall 14A is provided with the resilient piece 23 by cutting and raising. The resilient piece 23 is cantilevered forward from a rear part of the third wall 14A. The resilient piece 23 is resiliently deformable in the lateral direction with a base end of a rear end part substantially as a fulcrum. As shown in FIG. 5, the resilient piece 23 is provided more inwardly, i.e. rightwardly, of the rectangular tube portion 11 toward a front side as a whole. A tip part 23A, which is a front end part, of the resilient piece 23 is bent outwardly, i.e. leftwardly of the rectangular tube portion 11. A rightmost part of the resilient piece 23 serves as a pressing portion 24. The pressing portion 24 is disposed at a position near the contact point portion 16 of the resilient contact piece 15 in the front-rear direction. As shown in FIG. 6, the pressing portion 24 presses a side edge of the tab 41 inserted into the rectangular tube portion 11.

[Body Portion, Extending Portion]

Figure 4:
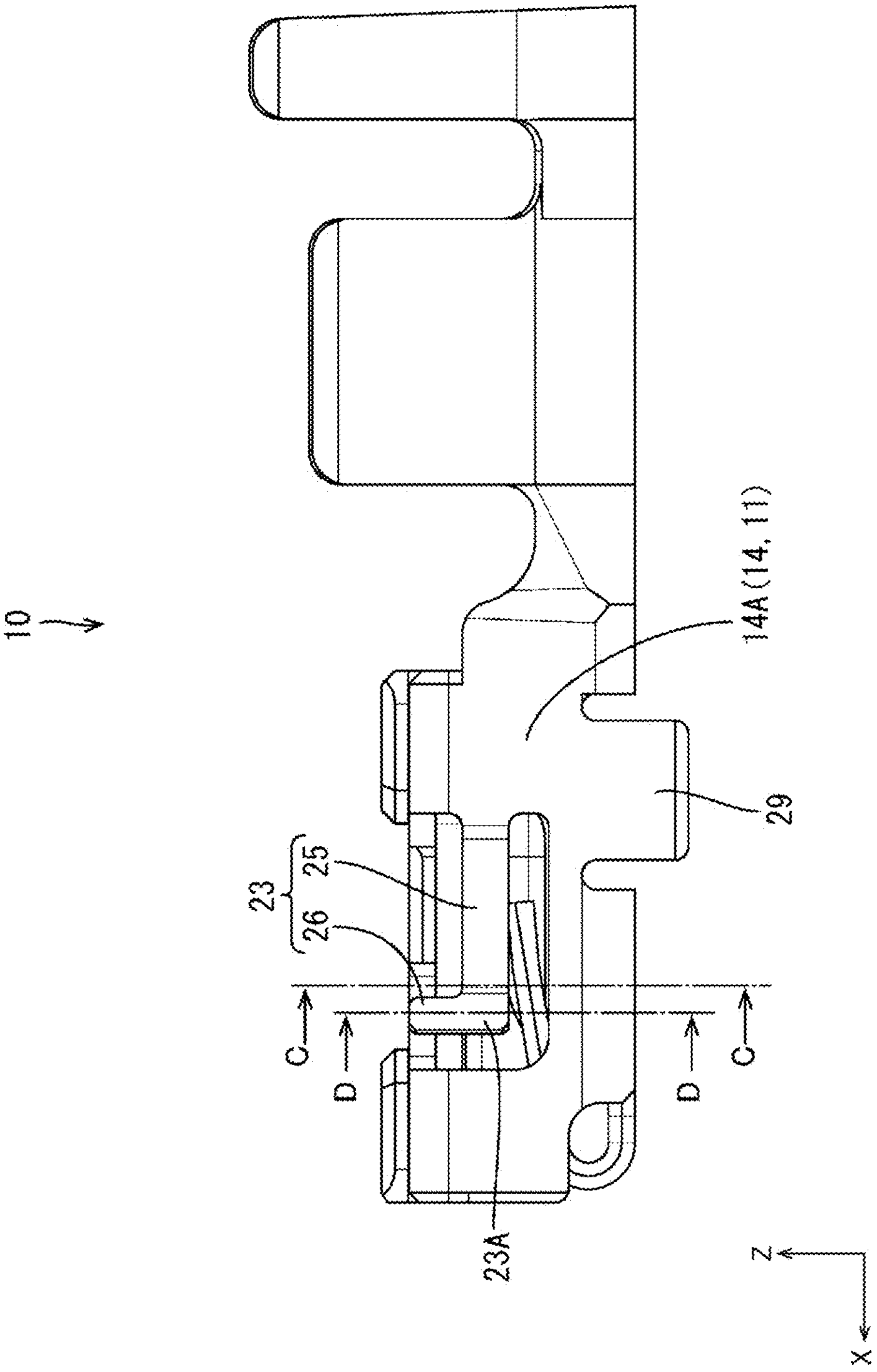
FIG. 4 is a left side view of the terminal.

As shown in FIG. 4, the resilient piece 23 is substantially L-shaped in a side view and includes a body portion 25 long in the front-rear direction and an extending portion 26 extending upward (an example of a direction orthogonal to both the first direction and the front-rear direction) from a tip part of the body portion 25. The extending portion 26 is an upper part of the tip part 23A of the resilient piece 23.

As shown in FIGS. 1 and 2, the extending portion 26 is disposed inside the recess 21 of the second wall 13. In this way, the tip part 23A of the resilient piece 23 can be arranged further inwardly (rightwardly) of the rectangular tube portion 11 than the third wall 14A provided with the resilient piece 23. Therefore, the pressing portion 24 of the resilient piece 23 is easily provided at a position to contact the left side edge of the tab 41. Further, since the resilient piece 23 is arranged not to project outwardly (leftwardly) of the rectangular tube portion 11, the resilient piece 23 hardly receives an external force.

[Contact Portion]

Figure 10:
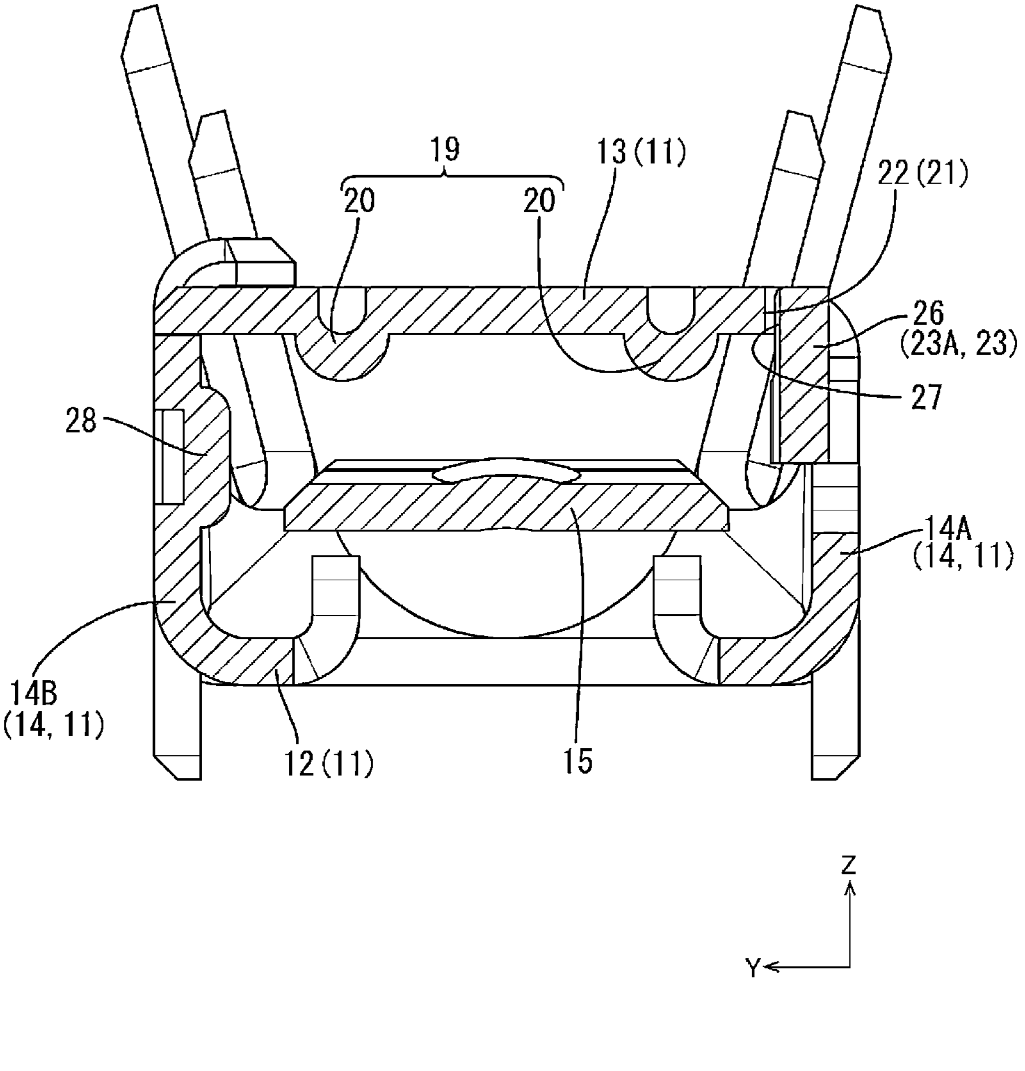
FIG. 10 is a section along D-D of FIG. 4.

As shown in FIG. 10, the extending portion 26 includes a contact portion 27 disposed to face the stopper portion 22 in the lateral direction. If the tip part 23A of the resilient piece 23 is moved rightward by an external force, the contact portion 27 and the stopper portion 22 come into contact.

[Pushing Portion]

As shown in FIGS. 3, 5 and 8, the fourth wall 14B is provided with a pushing portion 28 projecting leftward from the left surface of the fourth wall 14B. The pushing portion 28 is formed by being struck leftward. The pushing portion 28 has a rectangular shape long in the front-rear direction and short in the vertical direction. As shown in FIG. 8, the pushing portion 28 and the pressing portion 24 of the resilient piece 23 are disposed from the lower surface of the receiving portion 19 to a position somewhat below the upper surface of the resilient contact piece 15 in the vertical direction. An interval in the lateral direction between the pushing portion 28 and the pressing portion 24 is set to be slightly smaller than a lateral dimension of the tab 41.

As shown in FIGS. 6 and 9, with the tab 41 inserted in the rectangular tube portion 11, the tab 41 is sandwiched in the lateral direction between the pushing portion 28 and the pressing portion 24. In this way, a movement of the tab 41 in the lateral direction can be suppressed even under a vibration environment such as an automotive vehicle. Thus, the wear of the tab 41, the resilient contact piece 15 and the receiving portion 19 due to a movement of the tab 41 in the lateral direction can be suppressed and the connection reliability of the terminal 10 and the mating terminal 40 can be ensured.

As shown in FIGS. 3 and 4, projecting pieces 29 projecting downwardly of the rectangular tube portion 11 are respectively provided on rear parts of the pair of side walls 14. The projecting pieces 29 enter grooves provided in the unillustrated housing in accommodating the terminal 10 into the housing, thereby preventing the terminal 10 from being inserted upside down into the housing and guiding the insertion of the terminal 10 into the housing.

[Suppression of Movement of Tip Part of Resilient Piece by Stopper Portion and Contact Portion]

The terminal 10 according to this embodiment is configured as described above. A movement of the tip part 23A of the resilient piece 23 of the terminal 10 in the lateral direction is described below.

The resilient piece 23 of the terminal 10 is provided by cutting and raising the third wall 14A, and exposed to outside. Thus, the tip part 23A of the resilient piece 23 may move inwardly of the rectangular tube portion 11 by receiving an external force.

In this embodiment, the contact portion 27 is provided on the tip part 23A of the resilient piece 23 and the second wall 13 is provided with the stopper portion 22 facing the contact portion 27 in the lateral direction. In this way, even if the tip part 23A of the resilient piece 23 moves inwardly of the rectangular tube portion 11 (rightward) by receiving an external force, a movement of the tip part 23A of the resilient piece 23 inwardly (rightwardly) of the rectangular tube portion 11 beyond the stopper portion 22 is suppressed. Further, since the stopper portion 22 is disposed between the resilient contact piece 15 and the resilient piece 23 in the lateral direction, the contact of the tip part 23A of the resilient piece 23 and the resilient contact piece 15 is suppressed. Therefore, it can be suppressed that the resilient piece 23 is bent inwardly (rightwardly) of the rectangular tube portion 11 to deform the resilient contact piece 15 and hinder the insertion of the tab 41 of the mating terminal 40 into the rectangular tube portion 11.

Functions and Effects of First Embodiment

According to this embodiment, the following functions and effects are achieved.

The terminal 10 according to this embodiment is provided with the rectangular tube portion 11, into which the tab 41 of the mating terminal 40 is inserted from front, the resilient contact piece 15 provided in the rectangular tube portion 11 and the receiving portion 19 provided in the rectangular tube portion 11 and configured to sandwich the tab 41 together with the resilient contact piece 15. The rectangular tube portion 11 includes the first wall 12 provided with the resilient contact piece 15, the second wall 13 provided with the receiving portion 19 and the pair of side walls 14 connecting the both side edges of the first wall 12 and those of the second wall 13. The facing direction of the pair of side walls 14 is the first direction. At least one of the pair of side walls 14 includes the resilient piece 23 for suppressing a movement of the tab 41 in the first direction by pressing the side edge of the tab 41 inwardly of the rectangular tube portion 11 in the first direction. The rectangular tube portion 11 includes the stopper portion 22 for suppressing a movement of the tip part 23A of the resilient piece 23 inwardly of the rectangular tube portion 11 in the first direction. The resilient piece 23 includes the contact portion 27 disposed to face the stopper portion 22 in the first direction. The stopper portion 22 is disposed between the resilient contact piece 15 and the resilient piece 23 in the first direction, and the contact of the tip part 23A of the resilient piece 23 with the resilient piece 15 is suppressed by the contact of the contact portion 27 and the stopper portion 22.

According to this configuration, since a movement of the tab 41 in the first direction is suppressed by the resilient piece 23, the wear of the tab 41, the resilient contact piece 15 and the receiving portion 19 can be suppressed even under a vibration environment and the connection reliability of the terminal 10 and the mating terminal 40 can be ensured. A movement of the tip part 23A of the resilient piece 23 inwardly of the rectangular tube portion 11 in the first direction can be suppressed by the contact of the contact portion 27 of the resilient piece 23 and the stopper portion 22 of the rectangular tube portion 11. Since the stopper portion 22 is disposed between the resilient contact piece 15 and the resilient piece 23 in the first direction, the contact of the tip part 23A of the resilient piece 23 with the resilient contact piece 15 can be suppressed. Therefore, the deformation of the resilient contact piece 15, a connection failure of the terminal 10 and the mating terminal 40 and the like can be suppressed.

In this embodiment, the second wall 13 includes the stopper portion 22.

According to this configuration, since at least one of the pair of side walls 14 includes the resilient piece 23 and the second wall 13 includes the stopper portion 22, the contact portion 27 of the resilient piece 23 and the stopper portion 22 are easily arranged to face each other. Further, since the second wall 13 not including the resilient contact piece 15 is provided with the stopper portion 22, the contact of the resilient piece 23 and the resilient contact piece 15 is easily suppressed.

In this embodiment, the resilient piece 23 includes the body portion 25 long in the front-rear direction and the extending portion 26 extending from the tip part of the body portion 25 in the direction orthogonal to both the first direction and the front-rear direction, and the extending portion 26 includes the contact portion 27.

According to this configuration, a contact part of the contact portion 27 and the stopper portion 22 is easily made larger. Thus, the contact of the resilient piece 23 with the resilient contact piece 15 can be further suppressed.

In this embodiment, the rectangular tube portion 11 includes the recess 21 recessed in the first direction, the recess 21 includes the stopper portion 22 and the extending portion 26 is disposed inside the recess 21.

According to this configuration, since the extending portion 26 is disposed inside the recess 21, the tip part 23A of the resilient piece 23 can be arranged further inwardly of the rectangular tube portion 11 in the first direction than the side wall 14 (third wall 14A) provided with the resilient piece 23.

In this embodiment, only one (third wall 14A) of the pair of side walls 14 includes the resilient piece 23, and the other (fourth wall 14B) of the pair of side walls 14 includes the pushing portion 28 for sandwiching the tab 41 in the first direction together with the resilient piece 23.

According to this configuration, since a movement of the tab 41 in the first direction is suppressed by the resilient piece 23 and the pushing portion 28, the connection reliability of the terminal 10 and the mating terminal 40 can be ensured even under a vibration environment. Since the resilient piece 23 is provided in only one (third wall 14A) of the pair of side walls 14, the tip part 23A of the resilient piece 23 is less likely to move inwardly of the rectangular tube portion 11 as compared to the case where resilient pieces are provided in both of a pair of side walls.

Second Embodiment

A second embodiment of the present disclosure is described with reference to FIGS. 11 to 16. A terminal 110 of this embodiment is used under a vibration environment where vibration is generated as in the first embodiment. In the following description, a direction indicated by an arrow Z is referred to as an upward direction, a direction indicated by an arrow X is referred to as a forward direction and a direction indicated by an arrow Y is referred to as a rightward direction. Further, for the configuration of the second embodiment, members similar to those of the first embodiment are denoted by the same reference signs and detailed description on those members may be omitted.

[Terminal]

Figure 11:
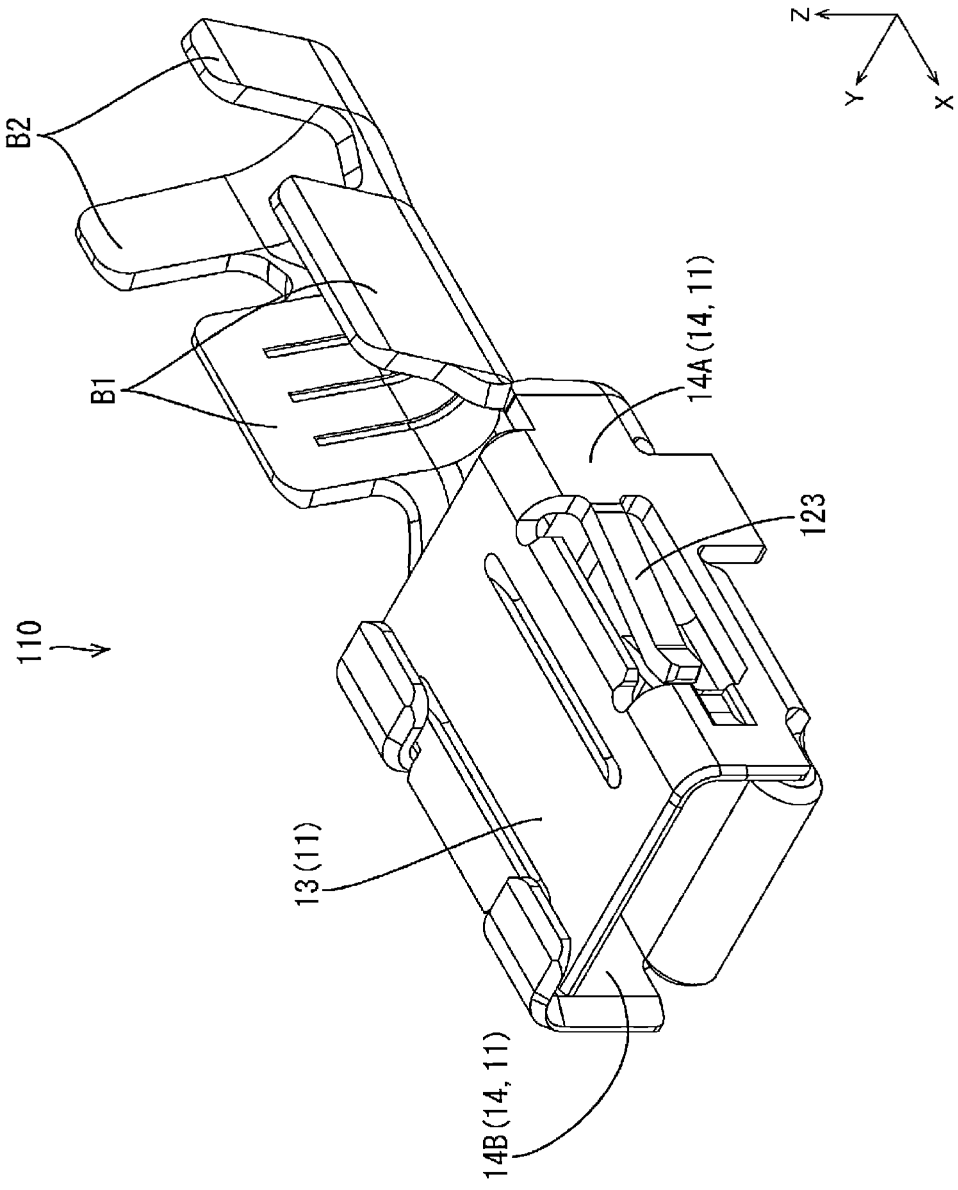
FIG. 11 is a perspective view of a terminal according to a second embodiment.
Figure 15:
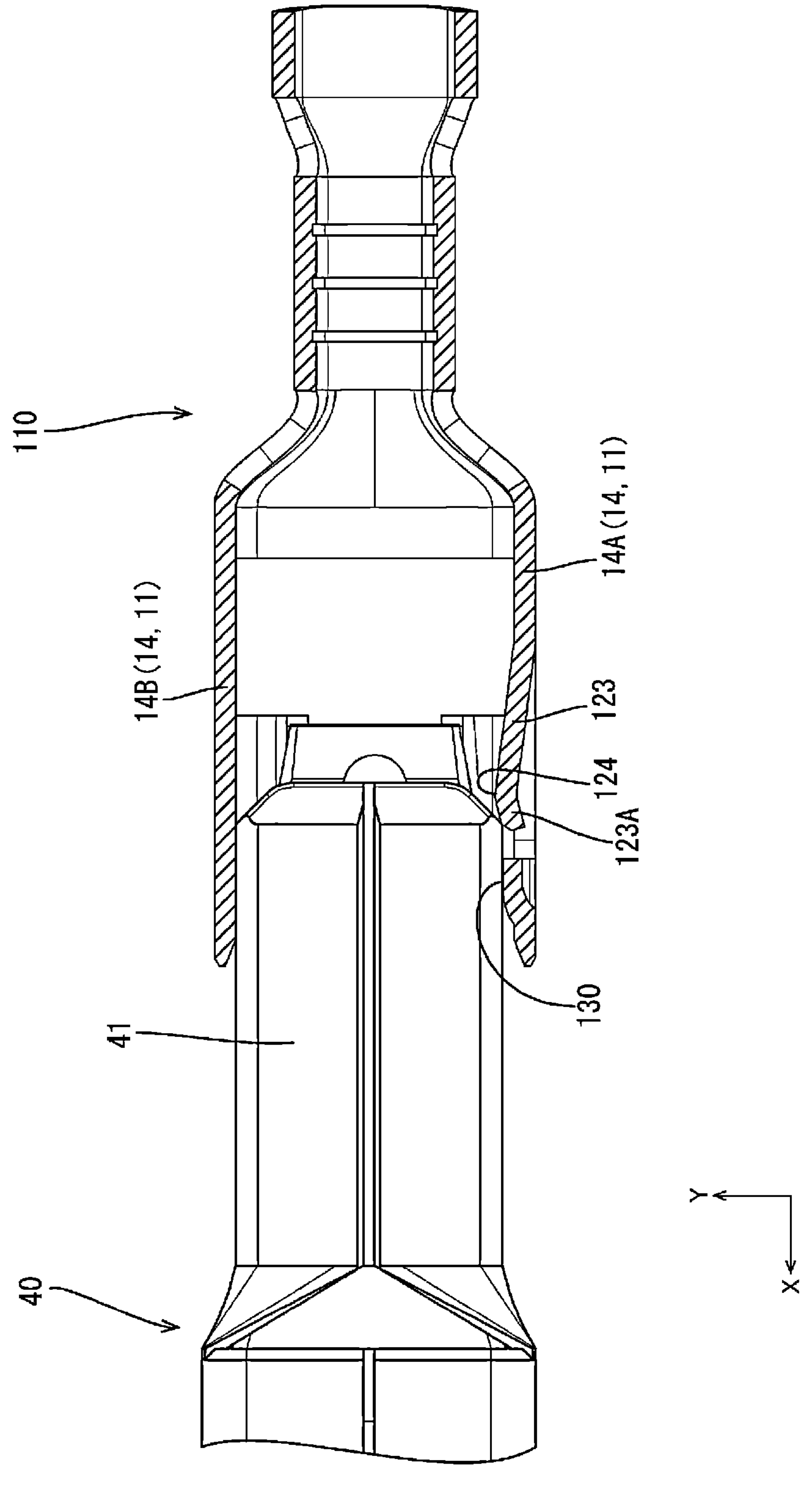
FIG. 15 is a section along E-E of FIG. 13 showing a state where the insertion of a tab of a mating terminal into a rectangular tube portion is started and the tab is in contact with a tip part of a resilient piece.
Figure 16:
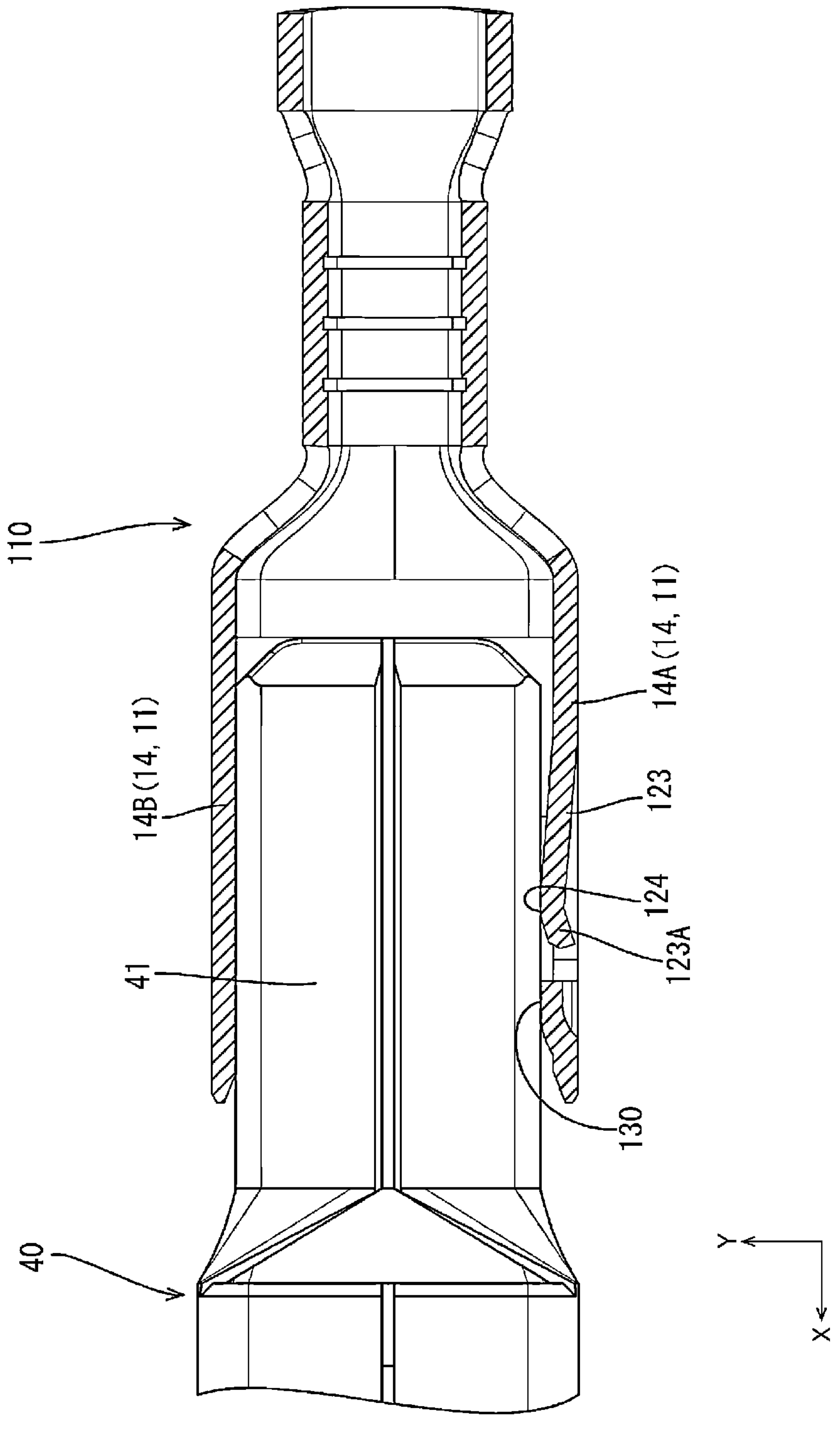
FIG. 16 is a section along E-E of FIG. 13 showing a state where the tab of the mating terminal is inserted in the rectangular tube portion.

The terminal 110 is formed by press-working and bending an electrically conductive metal plate material. As shown in FIG. 11, the terminal 110 is provided with a rectangular tube portion 11 open in a front-rear direction and a wire barrel B1 and an insulation barrel B2 disposed behind the rectangular tube portion 11. As shown in FIGS. 15 and 16, a tab 41 of a mating terminal 40 is inserted into the rectangular tube portion 11 from front.

[Rectangular Tube Portion, First Wall, Second Wall, Pair of Side Walls]

Figure 13:
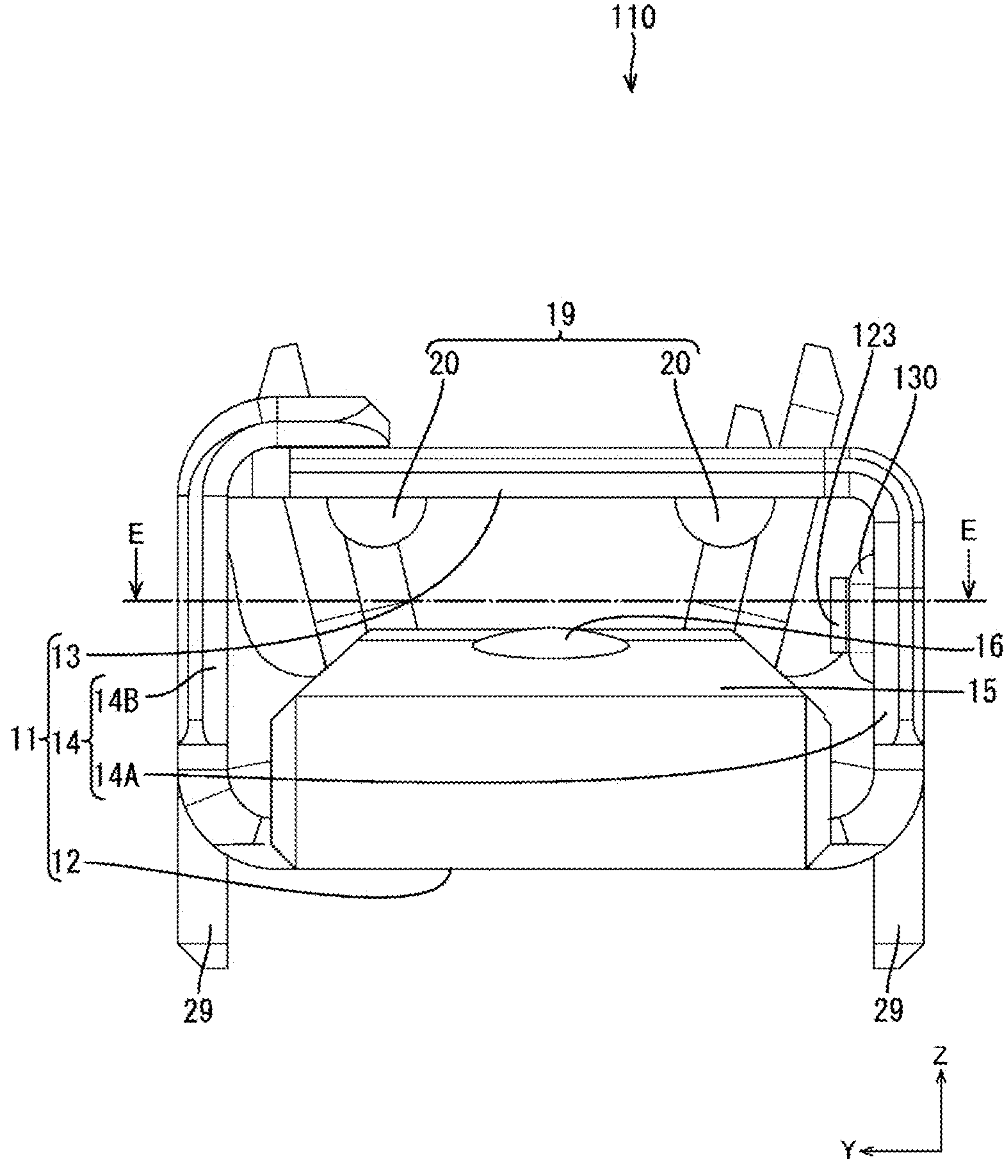
FIG. 13 is a front view of the terminal.

As shown in FIG. 13, the rectangular tube portion 11 includes a first wall 12, a second wall 13 facing the first wall 12 and a pair of side walls 14. The pair of side walls 14 are facing each other in a lateral direction (an example of the first direction). One of the pair of side walls 14 serves as a third wall 14A disposed on a left side of the rectangular tube portion 11. The other side wall 14 serves as a fourth wall 14B disposed on a right side of the rectangular tube portion 11.

[Resilient Contact Piece, Receiving Portion]

A resilient contact piece 15 is provided inside the rectangular tube portion 11. A contact point portion 16 is provided on the upper surface of the resilient contact piece 15. The second wall 13 is provided with a receiving portion 19 projecting downward from the lower surface of the second wall 13. The receiving portion 19 is composed of a pair of ridge portions 20 extending in the front-rear direction and arranged in the lateral direction. The tab 41 is sandwiched in a vertical direction between the contact point portion 16 of the resilient contact piece 15 and the receiving portion 19. In this way, the terminal 110 and the mating terminal 40 are electrically connected.

[Resilient Piece]

Figure 12:
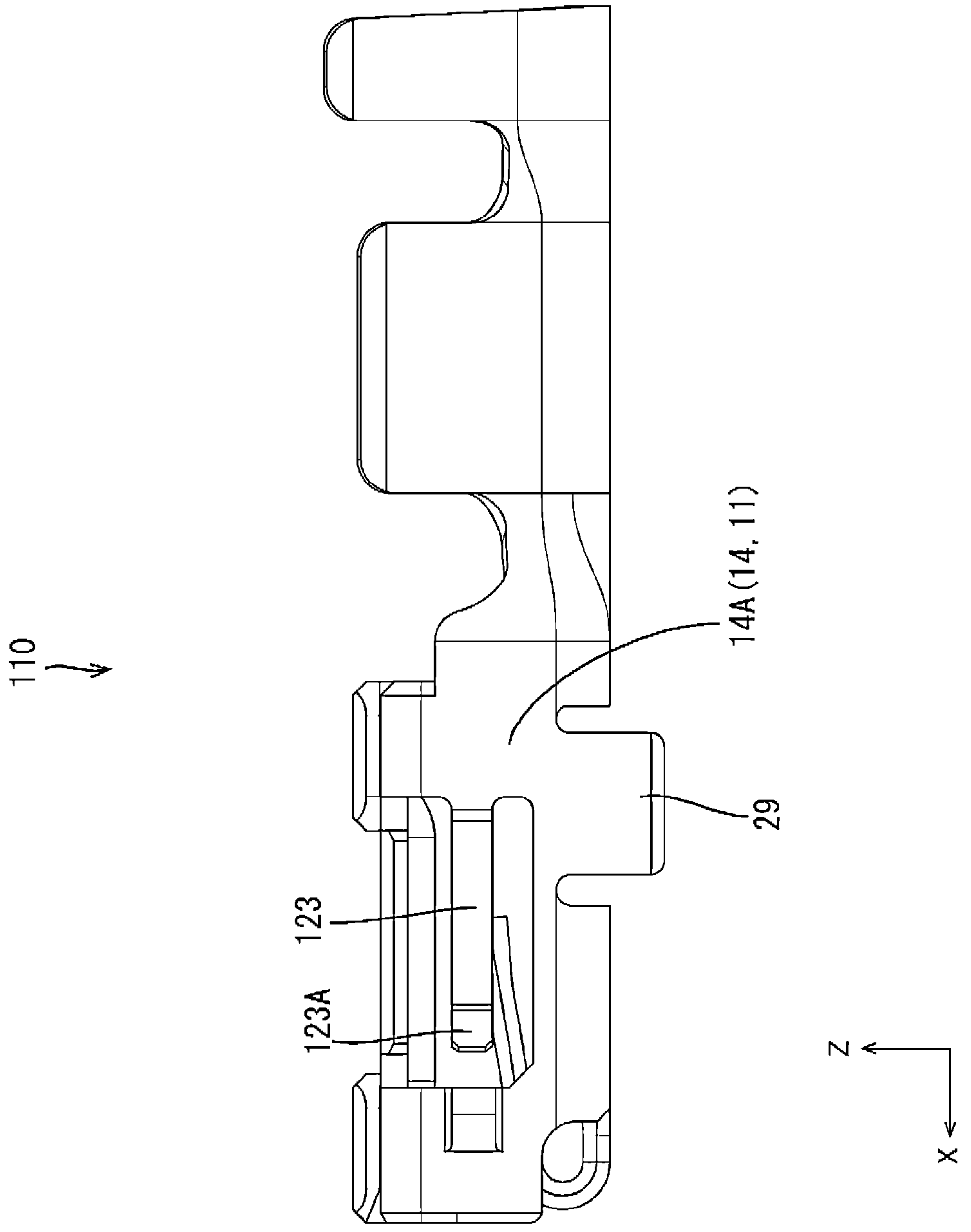
FIG. 12 is a left side view of the terminal.
Figure 14:
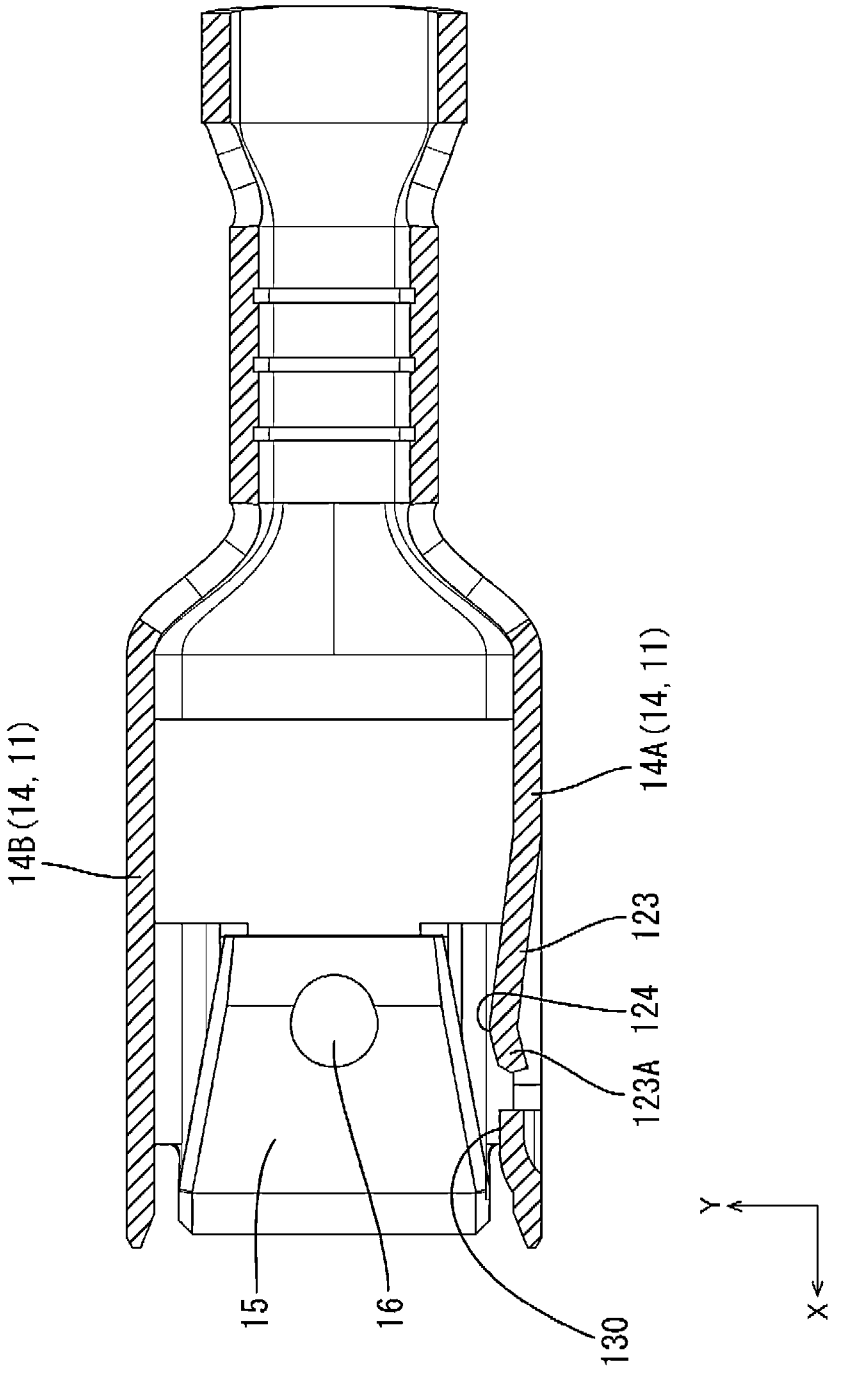
FIG. 14 is a section along E-E of FIG. 13.

As shown in FIGS. 11 and 12, the third wall 14A is provided with a resilient piece 123 by cutting and raising. The resilient piece 123 is formed to be long in the front-rear direction and connected to the third wall 14A at a rear end part. The resilient piece 123 is resiliently deformable in the lateral direction with a base end of the rear end part substantially as a fulcrum. As shown in FIG. 14, the resilient piece 123 is provided more inwardly, i.e. rightwardly, of the rectangular tube portion 11 toward a front side as a whole. A tip part 123A, which is a front end part, of the resilient piece 123 is bent outwardly, i.e. leftwardly of the rectangular tube portion 11.

[Pressing Portion]

A pressing portion 124 is provided at a position near a front end part of the resilient piece 123. The pressing portion 124 is located on the rightmost side of the resilient piece 123. The pressing portion 124 is disposed at a position near the contact point portion 16 of the resilient piece 15 in the front-rear direction. As shown in FIG. 16, the pressing portion 124 presses a side edge of the tab 41 inserted into the rectangular tube portion 11. When the resilient piece 123 is in a natural state, an interval in the lateral direction between the fourth wall 14B and the pressing portion 124 is set to be slightly smaller than a lateral dimension of the tab 41.

As shown in FIG. 16, with the tab 41 inserted at a proper position in the rectangular tube portion 11, the tab 41 is sandwiched in the lateral direction between the fourth wall 14B and the pressing portion 124. In this way, a movement of the tab 41 in the lateral direction can be suppressed even under a vibration environment such as an automotive vehicle. Thus, it is possible to suppress the wear of the tab 41, the resilient contact piece 15 and the receiving portion 19 due to a movement of the tab 41 in the lateral direction and ensure the connection reliability of the terminal 110 and the mating terminal 40.

[Projecting Portion]

As shown in FIGS. 13 and 14, the third wall 14A on a side in front of the resilient piece 123 is formed with a projecting portion 130 projecting inwardly (here, rightwardly) of the rectangular tube portion 11 from the third wall 14A. The projecting portion 130 is formed by being struck rightward. The projecting portion 130 is disposed substantially at the same height position as the resilient piece 123. An interval in the lateral direction between the fourth wall 14B and the projecting portion 130 is preferably set to be equal to the lateral dimension of the tab 41. Here, substantially equal means equal if manufacturing tolerances and the like are not considered.

The projecting portion 130 is preferably formed to extend in the front-rear direction. In this embodiment, the projecting portion 130 extends rearward until reaching an edge of an opening formed by cutting and raising the resilient piece 123.

If the insertion of the tab 41 into the rectangular tube portion 11 is started, the tab 41 first comes into contact with the projecting portion 130 in front of the resilient piece 123. If the tab 41 is further inserted into the rectangular tube portion 11, the tab 41 comes into contact with the resilient piece 123 as shown in FIG. 15. That is, since the resilient piece 123 is protected from front by the projecting portion 130, the resilient piece 123 is less likely to be deformed by being brought into contact with the tab 41.

If the projecting portion 130 is not provided unlike this embodiment, the tab 41 faces and contacts the resilient piece 123 in the front-rear direction and possibly deforms the resilient piece 123, for example, when the tab 41 is inserted into the rectangular tube portion 11 while sliding in contact with the third wall 14A. However, in this embodiment, a position where the tab 41 contacts the resilient piece 123 is adjusted by the projecting portion 130 contacting the tab 41 earlier than the resilient piece 123. Thus, the deformation of the resilient piece 123 due to improper contact of the tab 41 can be suppressed.

Since the resilient piece 123 is cantilevered forward and the pressing portion 124 is disposed on a front end part of the resilient piece 123 in this embodiment, the pressing portion 124 is disposed near the projecting portion 130. According to this arrangement, the resilient piece 123 is less likely to be pushed outwardly of the rectangular tube portion 11 by the tab 41, for example, even if the tab 41 is inserted in an oblique posture. Therefore, the deformation of the resilient piece 123 can be further suppressed.

If the interval in the lateral direction between the fourth wall 14B and the projecting portion 130 is substantially equal to the lateral dimension of the tab 41 as shown in FIG. 16, the tab 41 is sandwiched in the lateral direction by the projecting portion 130 and the fourth wall 14B. Further, if the projecting portion 130 extends in the front-rear direction, the projecting portion 130 comes into line contact with the tab 41. Thus, the insertion of the tab 41 in an oblique posture can be suppressed by the projecting portion 130. Therefore, the deformation of the resilient piece 123 is more easily suppressed by the projecting portion 130.

As described above, if the tab 41 is sandwiched in the lateral direction by the projecting portion 130 and the fourth wall 14B, the vibration of the tab 41 in the lateral direction in the rectangular tube portion 11 can be suppressed under a vibration environment. Thus, the wear of the tab 41, the resilient contact piece 15 and the receiving portion 19 due to vibration can be suppressed and the connection reliability of the terminal 110 can be further improved. Further, by suppressing the vibration of the tab 41, it can be suppressed that stress is repeatedly applied to the resilient piece 123. Therefore, the settling of the resilient piece 123 can be suppressed even under a vibration environment.

Functions and Effects of Second Embodiment

According to this embodiment, the following functions and effects are achieved.

The terminal 110 according to this embodiment is provided with the rectangular tube portion 11, into which the tab 41 of the mating terminal 40 is inserted from front, the resilient contact piece 15 provided in the rectangular tube portion 11 and the receiving portion 19 provided in the rectangular tube portion 11 and configured to sandwich the tab 41 together with the resilient contact piece 15. The rectangular tube portion 11 includes the first wall 12 provided with the resilient contact piece 15, the second wall 13 provided with the receiving portion 19 and the pair of side walls 14 connecting the both side edges of the first wall 12 and those of the second wall 13. The facing direction of the pair of side walls 14 is the first direction. One (third wall 14A) of the pair of side walls 14 includes the resilient piece 123 for suppressing a movement of the tab 41 in the first direction by pressing the side edge of the tab 41 inwardly of the rectangular tube portion 11 in the first direction, and the projecting portion 130 disposed in front of the resilient piece 123 and projecting inwardly of the rectangular tube portion 11.

According to this configuration, since a movement of the tab 41 in the first direction is suppressed by the resilient piece 123, the wear of the tab 41, the resilient contact piece 15 and the receiving portion 19 can be suppressed even under a vibration environment and the connection reliability of the terminal 110 and the mating terminal 40 can be ensured. Since the projecting portion 130 is provided in front of the resilient piece 123, the tab 41 comes into contact with the projecting portion 130 earlier than the resilient piece 123 when being inserted into the rectangular tube portion 11. Therefore, the deformation of the resilient piece 123 due to contact with the tab 41 can be suppressed.

In this embodiment, the resilient piece 123 extends in the front-rear direction, the rear end part of the resilient piece 123 is connected to one of the pair of side walls, and the pressing portion 124 for pressing the tab 41 is disposed at the position near the front end part of the resilient piece 123.

According to this configuration, since the pressing portion 124 of the resilient piece 123 is disposed near the projecting portion 130, the deformation of the resilient piece 123 is more easily suppressed.

In this embodiment, the tab 41 inserted into the rectangular tube portion 11 is sandwiched between the projecting portion 130 and the other (fourth wall 14B) of the pair of side walls 14.

According to this configuration, since the tab 41 is sandwiched between the projecting portion 130 and the other of the pair of side walls 14, the wear of the tab 41, the resilient contact piece 15 and the receiving portion 19 can be further suppressed under a vibration environment.

Other Embodiments (1) Although the resilient piece 23 is provided only in the third wall 14A and the pushing portion 28 is provided on the fourth wall 14B in the above first embodiment, there is no limitation to this and a resilient piece may be provided in each of a pair of side walls and a tab may be sandwiched in the first direction by a pair of the resilient pieces.

(2) Although the stopper portion 22 is provided in the second wall 13 in the above first embodiment, there is no limitation to this and a stopper portion may be provided in any one of first, third and fourth walls.

(3) Although the resilient piece 23, 123 is cantilevered forward from the rear part of the third wall 14A in the above first and second embodiments, there is no limitation to this. For example, a resilient piece may be cantilevered rearward from a front part of a third wall.

(4) Although the interval in the lateral direction between the fourth wall 14B and the projecting portion 130 is substantially equal to the lateral dimension of the tab 41 in the above second embodiment, there is no limitation to this. For example, an interval in the lateral direction between a fourth wall and a projecting portion may be slightly larger than a lateral dimension of a tab.

(5) Although the projecting portion 130 extends in the front-rear direction in the above second embodiment, there is no limitation to this and a projecting portion may not extend in the front-rear direction.

(6) Although the fourth wall 14B is not provided with the pushing portion 28 of the first embodiment in the above second embodiment, there is no limitation to this and a fourth wall may be provided with a pushing portion.

LIST OF REFERENCE NUMERALS

10: terminal
11: rectangular tube portion
12: first wall
13: second wall
14: side wall
14A: third wall
14B: fourth wall
15: resilient contact piece
16: contact point portion
17: excessive deflection preventing portion
18: locking portion
19: receiving portion
20: ridge portion
21: recess
21A: front surface
21B: rear surface
22: stopper portion
23: resilient piece
23A: tip part
24: pressing portion
25: body portion
26: extending portion
27: contact portion
28: pushing portion
29: projecting piece
40: mating terminal
41: tab
110: terminal
123: resilient piece
123A: tip part
124: pressing portion
130: projecting portion
B1: wire barrel
B2: insulation barrel

What is claimed is:

1. A terminal, comprising:

a rectangular tube portion, a tab of a mating terminal being inserted into the rectangular tube portion from front;

a resilient contact piece provided in the rectangular tube portion; and a receiving portion provided in the rectangular tube portion, the receiving portion sandwiching the tab together with the resilient contact piece, the rectangular tube portion including a first wall provided with the resilient contact piece, a second wall provided with the receiving portion and a pair of side walls connecting both side edges of the first wall and both side edges of the second wall, a facing direction of the pair of side walls being a first direction, at least one of the pair of side walls including a resilient piece for suppressing a movement of the tab in the first direction by pressing a side edge of the tab inwardly of the rectangular tube portion in the first direction, the rectangular tube portion including a stopper portion for suppressing a movement of a tip part of the resilient piece inwardly of the rectangular tube portion in the first direction, the resilient piece including a contact portion disposed to face the stopper portion in the first direction, the stopper portion being disposed between the resilient contact piece and the resilient piece in the first direction, and the tip part of the resilient piece being suppressed from contacting the resilient contact piece by the contact of the contact portion and the stopper portion.

2. The terminal of claim 1, wherein either one of the first and second walls includes the stopper portion.

3. The terminal of claim 2, wherein the second wall includes the stopper portion.

4. The terminal of claim 1, wherein:

the resilient piece includes a body portion long in a front-rear direction and an extending portion extending from a tip part of the body portion in a direction orthogonal to both the first direction and the front-rear direction, and the extending portion includes the contact portion.

5. The terminal of claim 4, wherein:

the rectangular tube portion includes a recess recessed in the first direction, the recess includes the stopper portion, and the extending portion is disposed inside the recess.

6. The terminal of claim 1, wherein:

only one of the pair of side walls includes the resilient piece, and the other of the pair of side walls includes a pushing portion for sandwiching the tab in the first direction together with the resilient piece.

* * * * *